Figure 1A:
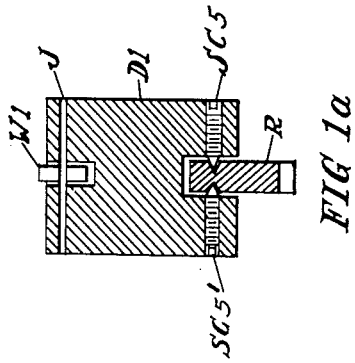

July 20, 1954  H. J. TYZZER  2,684,462
ELECTRICAL ALTERNATING VOLTAGE DEVELOPING APPARATUS
Original Filed Feb. 9, 1946                6 Sheets-Sheet 1

HOWARD J. TYZZER
INVENTOR.

BY [signature]

ATTORNEY

July 20, 1954   H. J. TYZZER   2,684,462
ELECTRICAL ALTERNATING VOLTAGE DEVELOPING APPARATUS
Original Filed Feb. 9, 1946   6 Sheets-Sheet 3

HOWARD J. TYZZER
INVENTOR.

BY

ATTORNEY

July 20, 1954  H. J. TYZZER  2,684,462
ELECTRICAL ALTERNATING VOLTAGE DEVELOPING APPARATUS
Original Filed Feb. 9, 1946                                6 Sheets-Sheet 4
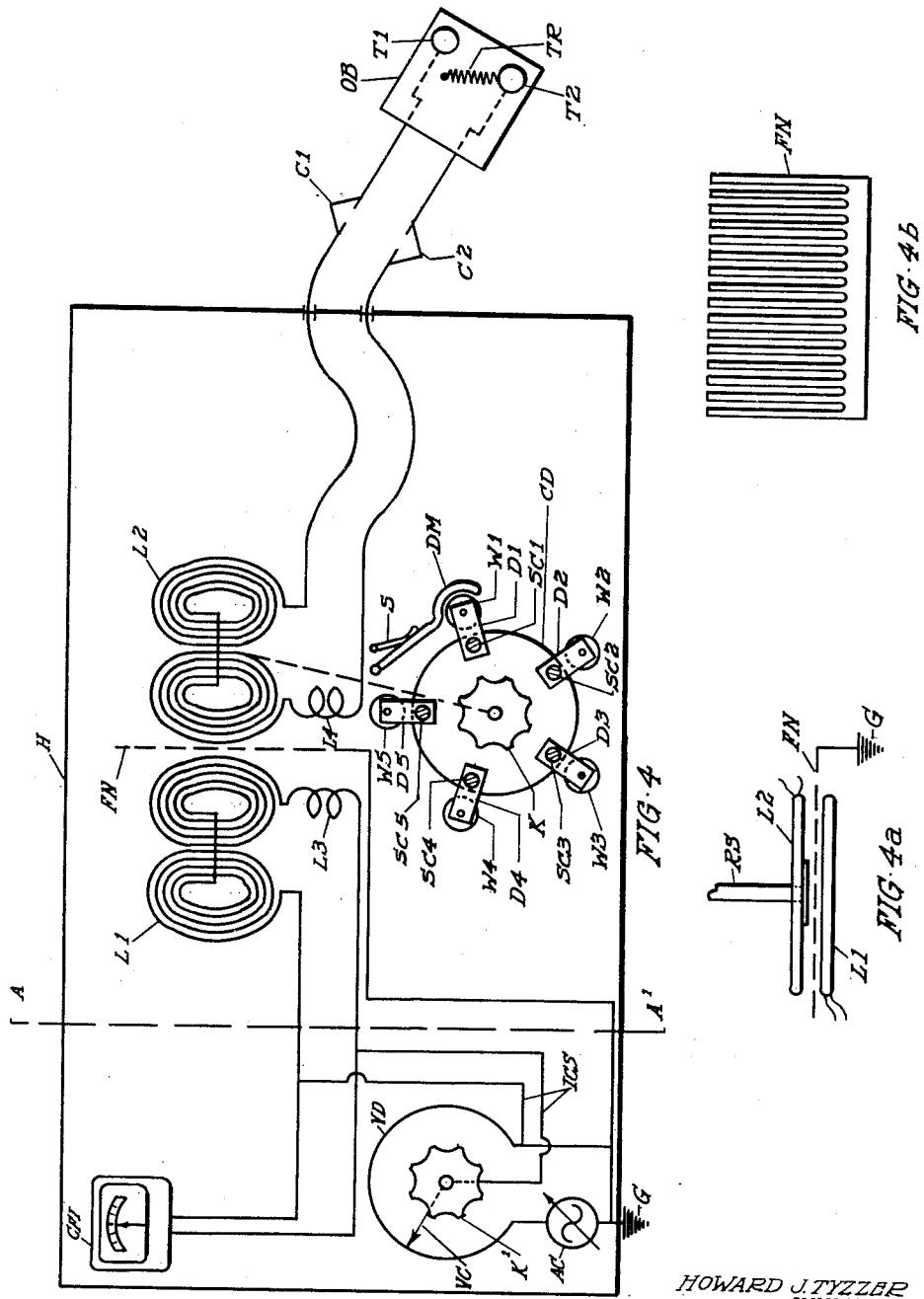
HOWARD J. TYZZER
INVENTOR.
BY
ATTORNEY July 20, 1954  H. J. TYZZER  2,684,462
ELECTRICAL ALTERNATING VOLTAGE DEVELOPING APPARATUS
Original Filed Feb. 9, 1946  6 Sheets-Sheet 5
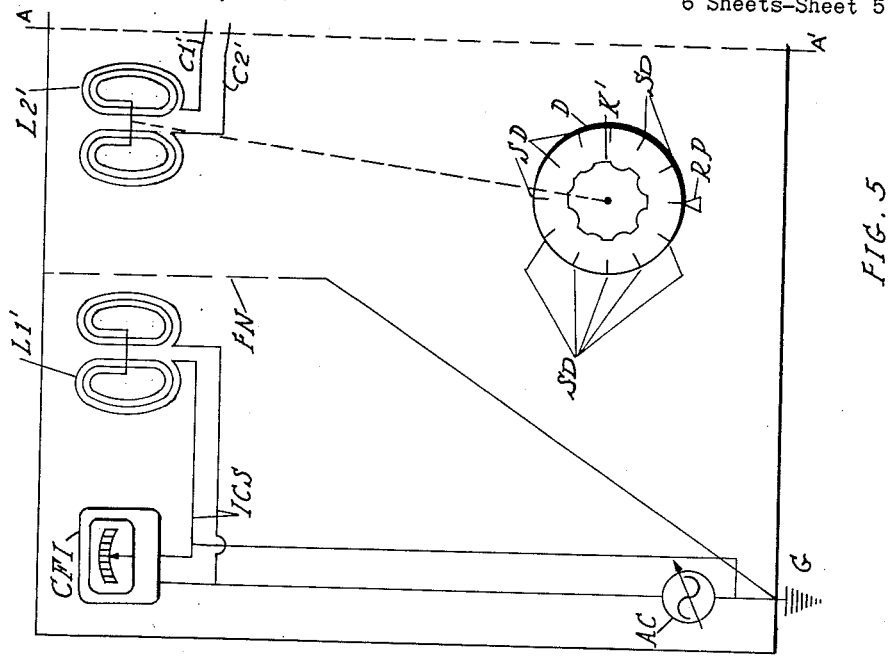
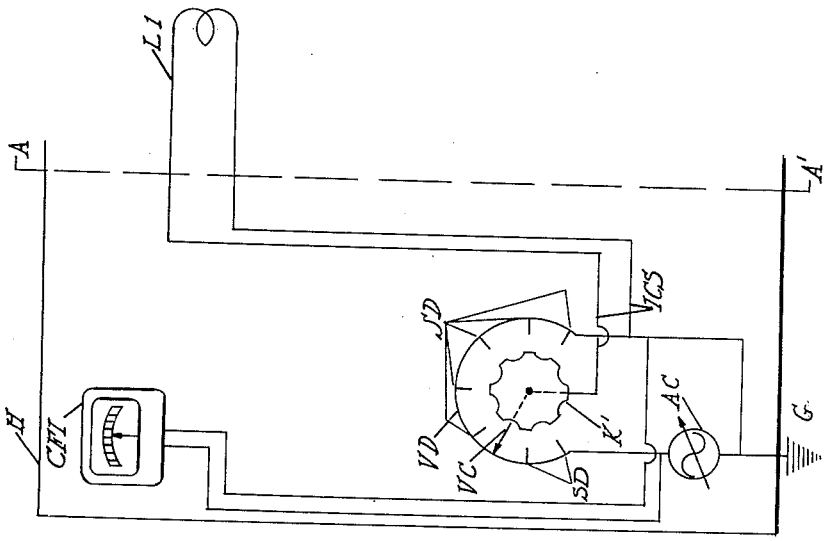
HOWARD J. TYZZER
INVENTOR.
BY
ATTORNEY

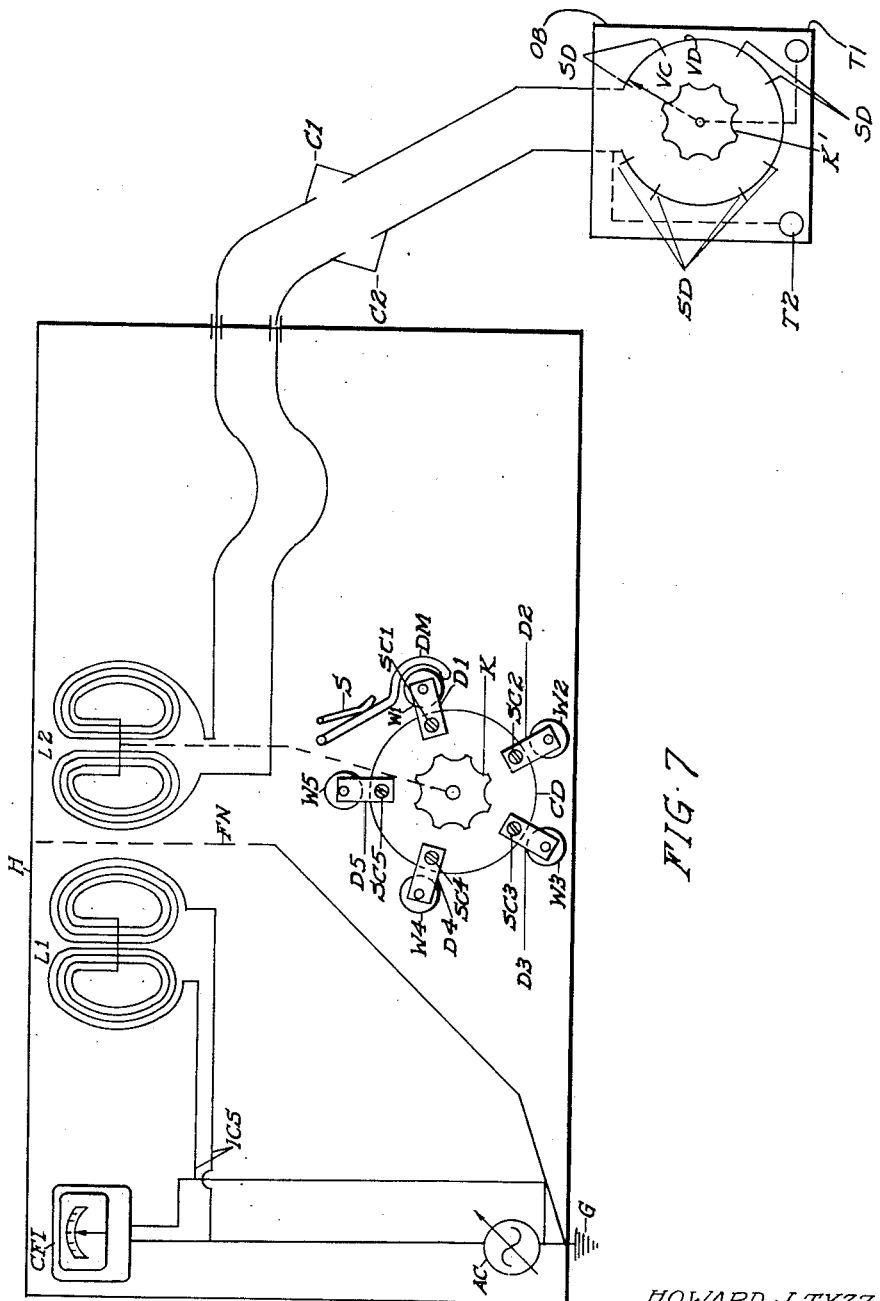

Patented July 20, 1954

2,684,462

UNITED STATES PATENT OFFICE 2,684,462

ELECTRICAL ALTERNATING VOLTAGE DEVELOPING APPARATUS

Howard J. Tyzzer, Mountain Lakes, N. J., assignor to Ferris Instrument Laboratories, Boonton, N. J., a corporation of New Jersey Continuation of abandoned application Serial No. 646,631, February 9, 1946. This application October 8, 1948, Serial No. 53,571

13 Claims. (Cl. 323—53)

The present invention broadly relates to combined electrical and mechanical apparatus for producing from a variable source of alternating voltage (which may also vary widely in frequency) a plurality of discrete output voltage values, which may, for example, be related by successive fixed ratios, such as of 10 to 1, and also to produce a continuously variable output voltage values over respective ranges in the neighborhood of these discrete fixed values.

The present invention is a continuation of my prior application for "Electrical Alternating Current Voltage Developing," Serial No. 646,631, filed February 9, 1946, now abandoned.

In particular, the present invention is especially adapted for use in a highly accurate and sensitive signal generator producing variable frequency output, the invention serving to produce accurately calibrated output voltages from such a signal generator. By way of example, a signal generator including the present invention may produce output voltages ranging from one microvolt to one volt in decade steps.

In utilizing such signal generators, for example in testing or calibrating other electrical apparatus such as radio receivers, radar apparatus, television receivers, or the like, it is highly important to be able to produce an accurate test or calibrating voltage in the desired operating range of the apparatus utilizing such voltage with a minimum of time and effort. The necessary voltages may be in the order of volts, millivolts, or microvolts. Previously, by the use of continuously adjustable attenuators interposed in the output of signal generators or other sources of alternating voltage, it has been extremely cumbersome to vary the output voltage quickly from a voltage of the order of several volts to one of the order of microvolts, since continuously variable attenuators of such type require considerable adjustment to go from one extreme to the other. This difficulty has been overcome in the past by use of decade-type attenuators in which by successive steps the voltage may be reduced by ratios of 10 to 1. One such type of signal generator is shown in Ferris Patent No. 2,265,637 and in Tyzzer Patent No. 2,376,101.

Such signal generators have utilized resistive type attenuators as the means for stepping down the voltage to the required level. While such attenuators are eminently satisfactory for work in the conventional high frequency ranges, extending from 3 to 30 megacycles per second, when frequencies of the very-high range (30 to 300 megacycles per second) or in the ultra-high frequency range (300 to 3000 megacycles per second) are used such resistive attenuators interpose numerous errors which render their use extremely limited, even when provided with special correction networks. For example, not only must such resistive attenuators be composed of resistors which are closely matched by careful selection, but the question of stray reactance always inherent in such resistors and their leads becomes a very troublesome one at the higher frequency ranges. Thus, even the lengths of the leads or the character of the soldered connection can cause an unbalance or an added stray reactance which can destroy the accurate calibration of such a signal generator and can render them completely lacking in uniformity during manufacture or use, and hence not commercially practicable. This harmful effect is enhanced by troublesome stray pickings at higher frequencies, due to unavoidable mutual coupling and ineffective shielding. A further disadvantage is the substantial power dissipation in the resistors.

The present invention retains all the advantages of the decade-type signal generator while permitting extension of its use into the very-high and ultra-high frequency ranges without the difficulties formerly encountered in connection with the manufacture, calibration and use of such instruments. According to the present invention a calibrated signal generator is provided which can be readily and accurately set at the factory to provide very precise output voltages differing by uniform steps, such as decade steps (factors of 10). In addition, any one of the output voltages can be continuously varied over a wide enough range so that any voltage from one in the order of a microvolt to one on the order of several volts can be readily attained. Furthermore, each output voltage thus obtained has its magnitude precisely known and determined.

Other objects and advantages of the present invention will become apparent to those skilled in this art from the following description of preferred embodiments and modifications thereof and the appended drawings in which—

Figure 1:
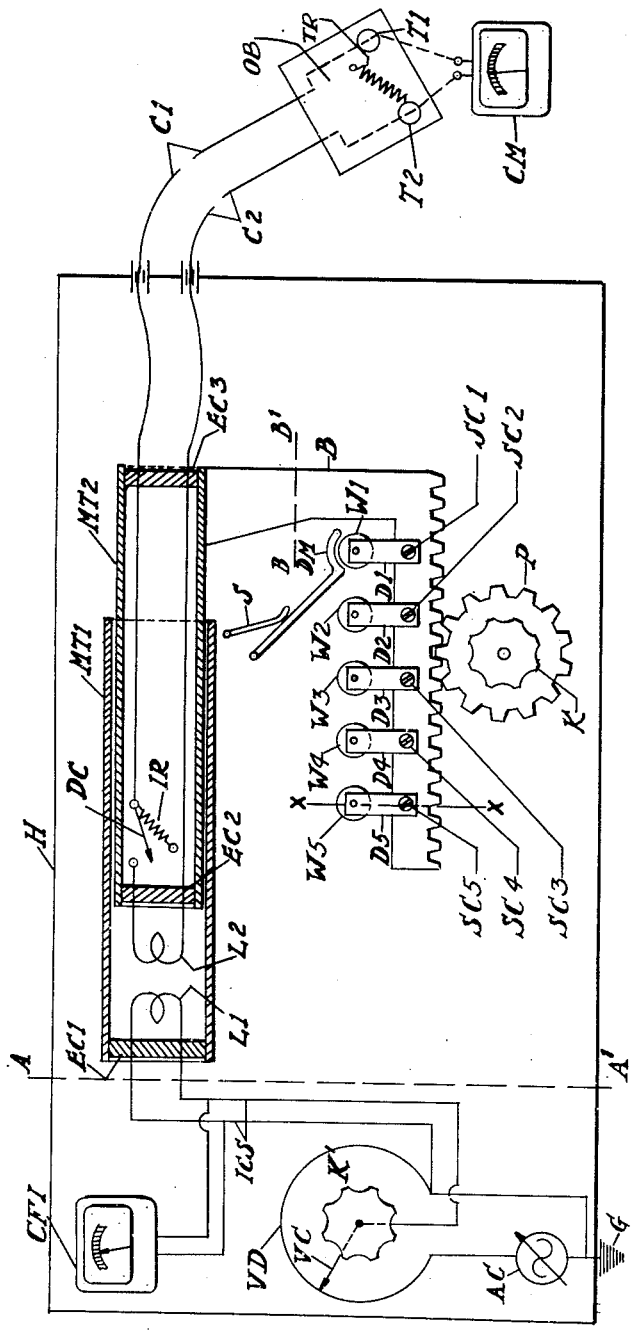

Figure 1 schematically illustrates one particular embodiment of a combined electrical and mechanical assembly containing all elements essential to fully practicing my present invention subject, however, to several modifications without departing from the spirit thereof in any material way.

Figure 2:
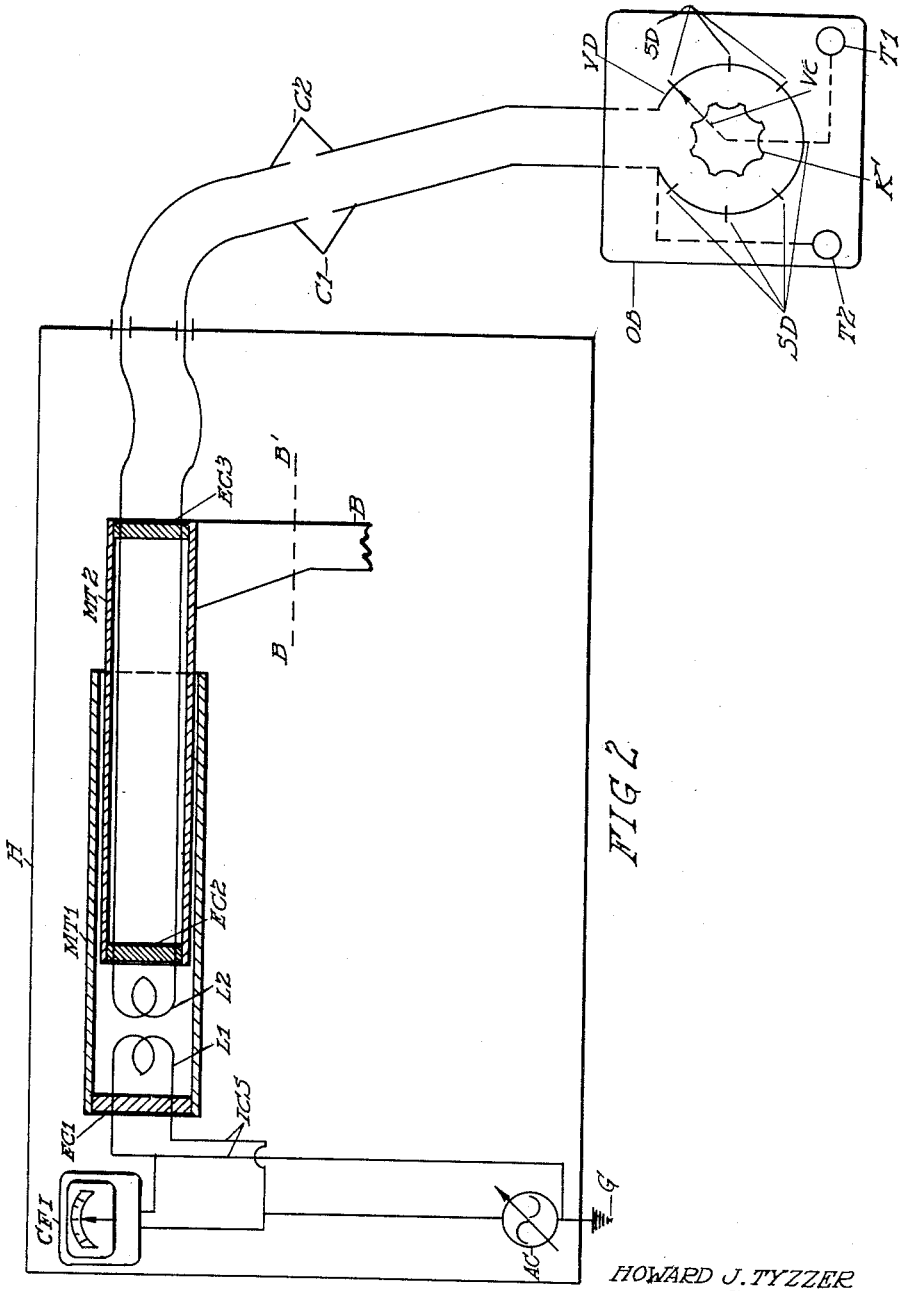
Figure 3:
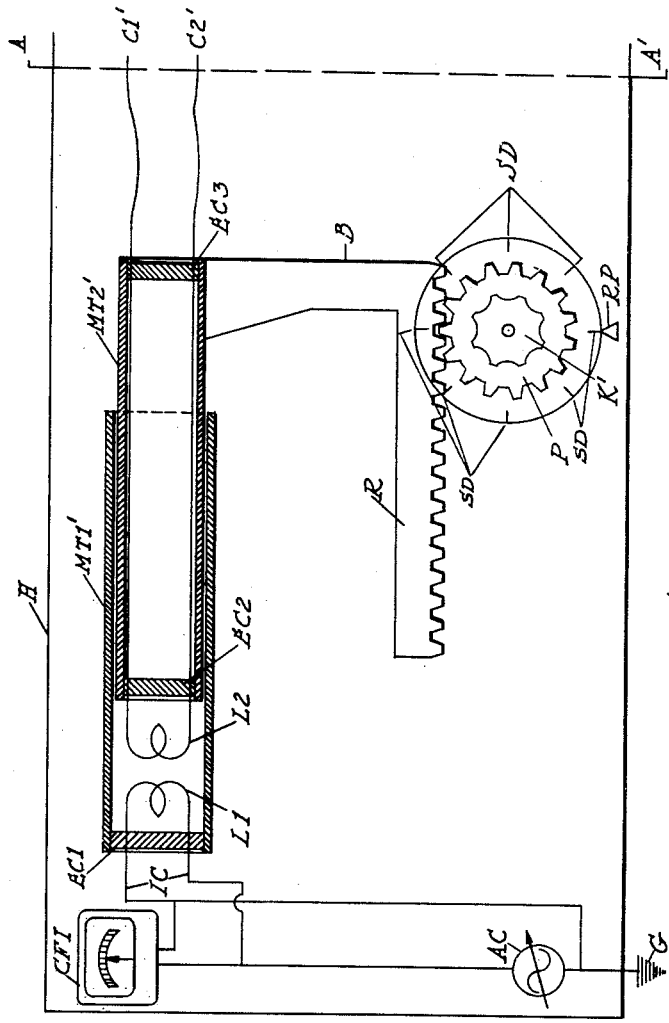

Figure 1(a) is a cross sectional view of an important combination of some of the elements of the mechanical portion of the combined assembly of Figure 1;

Figure 2 schematically illustrates one minor modification of the combined assembly of Figure 1;

Figure 3 schematically illustrates a more or less major modification of the combined assembly of Figure 1;

Figure 4 schematically illustrates a second more or less major modification to which the combined assembly of Figure 1 is subject;

Figures 4(a) and 4(b) depict different clarifying views of certain elements of Figure 4;

Figure 5 schematically illustrates a more or less major modification of the combined assembly of Figure 4;

Figure 6 schematically illustrates a minor modification of the assembly of Figure 4 or of Figure 1; and Figure 7 schematically illustrates a second minor modification of the combined assembly of Figure 4.

In the various figures of the drawings like symbols represent like symbols or parts similar to a substantial extent and many of the symbols indicate the nature or the function of the respective parts to which they relate.

Referring first to Figures 1 and 1(a), there is shown a shield housing H containing a source of alternating current or voltage schematically represented at AC. The arrow extending through this symbol AC is intended to indicate that this source is adapted to supply outputs of varying voltages and frequencies and in particular, frequencies in the very-high and ultra-high frequency ranges. Preferably the source AC is an electron tube generator with its associated circuits whose design is now well known and requires no specific illustration. The terminals of source AC, one of which is connected to the housing H and grounded at G, are connected to a variable voltage divider VD having a moveable contactor VC actuated by a knob K'. As illustrated, voltage divider VD is preferably circular in form and may be formed of any suitable voltage-dividing construction, preferably in the form of a resistive wire of uniform cross sectional dimensions for producing a substantially uniform voltage per unit length thereof.

Connected between the grounded terminal of voltage divider VD and the variable contact VC are a pair of conductors ICS leading to a concentrated electrically conductive unit L1 indicated as in the form of an inductance coil. It is therefore apparent that by adjusting the position of the variable contact VC by suitably actuating the control knob K', an adjustable fractional part of the output voltage of source AC is applied across the conductive unit L1. Also connected across conductors ICS is a suitable meter CFI such as a voltmeter, indicated as having the usual visible scale and the usual hand movable therealong. This meter CFI indicates the relative magnitude of the voltage applied to the concentrated conductive unit L1, but, as will be explained hereinbelow, it is not called upon to indicate accurately the actual magnitude of this voltage. Preferably, the scale of indicator CFI is marked in arbitrary units with full scale indicated at 1.0, and extending down to 0.1.

The concentrated unit L1 is contained in a shielded conductive housing, indicated illustratively as a length of tubing MT1, which may assume any suitable configuration. This housing MT1 is in telescoping sliding relation with another suitably shaped metallic housing MT2 which carries a second concentrated electrically conductive unit L2 also indicated as an inductance coil. The terminals of concentrated unit L2 are connected by way of conductors C1 and C2 through the housing MT2 and the housing H to an output box OB containing a pair of output terminals T1 and T2. The shielded housings MT1 and MT2 are provided with respective metallic end closures EC1, EC2 and EC3 through which the respective conductors pass.

Accordingly, the region surrounding the concentrated units L1 and L2 is to all intents and purposes completely isolated from their surroundings from the point of view of any field effects therein. This is an important precaution particularly in the case of operations in the very-high or ultra-high frequency ranges, since the apparatus is thereby rendered independent of extraneous influences. The concentrated unit L2 is therefore brought into the field influence of concentrated unit L1 and, by varying the separation between these units L2 and L1, the amount of power flow from unit L1 to unit L2 can be readily adjusted. Unit L2 thereupon becomes a secondary source of alternating voltage of reduced amplitude, the reduction in amplitude depending upon the spacing between the units L1 and L2.

The rate of change of output voltage from unit L2 consequent upon changes in the spatial relation of the two units L1, L2 varies generally in accordance with various logarithmic laws under different conditions of design. This renders it very difficult to provide an accurate continuous calibration of the attenuation produced thereby, since any chosen scale suitable for one instrument may be found to be hopelessly inaccurate when applied to another apparently identical instrument due to minor manufacturing or assembling changes. However, this difficulty is completely overcome by the present invention.

For most uses, such as in checking the performance of radio, radar or television apparatus during manufacture or servicing, it is important to know accurately the magnitude of the voltage applied to the apparatus during such tests or operations. It is also important to be able to derive quickly an accurately known voltage value in a desired voltage range, such as in the microvolt range or in the millivolt range or in the volt range.

According to the present invention, such accurately known output voltages are obtainable in the following manner: Rigidly connected to the housing MT2 carrying the unit L2 is a bracket B carrying a rack R engaged by a pinion P to which is fixed a knob K. Thus rotation of knob K varies the output voltage by changing the separation of units L1, L2. Rack R carries a plurality of riders D1, D2, D3, D4, and D5, all substantially of the type illustrated more in detail in Figure 1(a) which represents a cross sectional view along line X—X of Figure 1. Each of these riders is individually adjustable along the length of rack R and may be fixedly positioned at any desired location along rack R by set screws SC1, SC2, etc. Each of these riders D1, D2, etc. has at its upper end a rotatable wheel W1, W2, etc. Mounted pivotally with respect to the housing H is a member DM having an arcuate detent. Detent member DM is resiliently urged by a spring S into engagement with one of the wheels W1, W2, etc. which may be under it, and thereby determines a plurality of settable positions for unit L2.

According to the present invention, the difficulties in providing a continuous calibration for the output voltages are overcome by merely accurately providing a plurality of discrete output voltages in fixed steps, such as decade steps, and further providing means for accurately adjusting such voltages, as desired. For this purpose, the following calibrating procedure is followed.

The source AC is selected or designed to produce an output voltage large enough to produce the necessary maximum output voltage, and slightly larger than required for the full scale deflection of meter CFI. Then voltage divider VD is adjusted so that indicator CFI reads exactly 1.0 (full scale).

A calibrating meter suitable for accurately indicating voltages over the entire range of output voltages, such as a precision vacuum tube voltmeter is shown at CM and its dotted line connection to the output terminals T1, T2 indicates that it is so connected merely for calibrating purposes but not during actual use of the apparatus. Ordinarily, several different calibrating meters will have to be used, due to the general unavailability of instruments which are accurate over such a wide range of output voltages as are here contemplated. Alternatively, accurate amplifiers may be included in such a meter.

Then knob K is adjusted until meter CM registers exactly the maximum desired output voltage, which may be, for example, one volt. The rider D1 is then adjusted until its wheel W1 is directly under the arcuate detent DM, whereupon rider D1 is set in fixed position by its set screw SC1. The bracket B carrying the movable housing MT2 is then adjusted by rotation of the knob K until the indicator CM reads a new value of voltage differing from the first value by a predetermined desired factor. In the example, being used, the second voltage might be $\frac{1}{10}$ volt. With the bracket B retained in this position, the rider D2 is then adjusted and fixed in position where its wheel W2 engages the detent member DM. Similarly, knob K is actuated further until the voltage indicated at meter CM differs from the last voltage by the same factor. For example, the new voltage may now be 10 millivolts, or $\frac{1}{10}$ of the preceding voltage. Rider D3 is now set at this position. This procedure is repeated until all the riders D1 to D5, or as many more as are utilized, have been set. When this operation is completed, the output can be readily adjusted by a factor of 10 merely by proceeding from one detent position to the next detent position. The spring loaded detent member accurately positions the rack R in each desired position. The calibrating procedure just described is then effective to provide accurately known discrete output voltages with constant ratio between successive voltages.

Adjustment of the voltage divider VD will of course produce a proportionate adjustment of the discrete output voltages, without changing their ratio. Thus, by varying voltage divider VD until meter CFI registers 0.5, each of the former discrete output voltage values is multiplied by 0.5. Thus voltage divider VD provides a continuous vernier-type control, and meter CFI indicates a multiplying factor for the output voltages. Thus any voltage can be obtained between any two successive discrete output values and the entire range of voltages can be very accurately determined. For example, by using six riders, voltage ranges in the order of microvolts, tens of microvolts, hundreds of microvolts, millivolts, tens of millivolts, hundreds of millivolts and volts can be obtained.

It is found that the adjustments in decade steps or similar fixed steps of the type just described remain very accurate despite wide variations in operating frequency, since it is essentially only the ratio between the discrete output voltages which has to be kept fixed and these ratios are accurately preset and maintained. If the design of the combined assembly is intended to produce output voltages varying between a microvolt and one volt for example, the source AC will be made capable of generating an output voltage sufficiently larger than the maximum desired voltage so as to always provide, without overloading, the necessary maximum output voltage of one volt across terminals T1, T2 at any frequency in the operating range. Source AC may be adjustable to permit variations in its output level to a desired value. The only conventional meter used is CFI, and always responds only to voltages in a narrow range (0.1 to 1.0 volt in the illustrative example) so that a conventional meter of proper accuracy is available (such as a vacuum tube voltmeter) and can be used. By the present invention, the range of meter CFI is effectively increased from 10:1 to 1,000,000 to 1 or more, without decrease in precision.

The instrument also is rendered substantially independent of variation in output from source AC, since such variation will at once show up on meter CFI which will automatically give the proper correction or multiplying factor.

It will be noted that calibrating meter CM is coupled directly to the output terminals T1, T2. In this way, any losses inherent in the leads C1, C2, which may be substantial at the higher operating frequencies, are taken into account and have no effect on the accuracy of the output voltages.

If desired or necessary at the very high or ultra-high frequencies encountered terminating resistors TR can be connected between the output terminals T1 and T2. Similarly, a terminating resistor IR can be optionally connected in series with the conducting unit L2 or short circuited by operation of switch DC.

It will be understood that a scale may be provided for variable contact VC in place of or with the scale for indicator CFI, to produce the band spread effect or vernier action for deriving voltages between the discrete values produced by the decade steps of the attenuator formed by units L1, L2. In addition, knob K can be roughly calibrated, to indicate approximately the values of output voltage between the accurate discrete values.

It thus has been made clear that the present invention, especially when used in signal generators, has overcome the prior inconvenience due to the large time factor in switching from one output voltage to the next, since single actuation of knob K serves quickly to obtain an output voltage in the desired range, which adjustment of variable contact VC quickly provides the exact desired voltage.

While the present device is adaptable for use over a very wide range of frequencies, it may happen that its calibration at extreme ends of the frequency range may not be exactly the same. This difficulty is readily overcome merely by readjusting variable contact VC to a new datum position. For this purpose, a frequency calibration chart can be provided for the scale of indicator CFI. However, usually such correction for frequency will not be necessary.

The apparatus of Figure 2 is similar to the apparatus of Figure 1 with the exception that the voltage divider VD is transferred from the input side of the attenuator, to the output side, and is here connected directly across output leads C1, C2, the output terminals T1, T2 being connected respectively to the variable contact VC and one terminal of the voltage divider VD. The voltage divider thereby replaces the terminating resistor TR, and preferably should match the impedance of link C1, C2. A scale having scale divisions SD can then be provided for indicating accurately the voltage values intermediate the discrete fixed values provided by the attenuator L1, L2. The input to attenuator L1, L2 is then adjusted to the proper value (read on meter CFI) by adjusting the source AC. It is to be understood that the structure below line B, B' of Figure 2 is the same as in Figure 1, and the same advantages accrue to this embodiment of the invention.

Figure 3 shows a further modification of Figure 1 in which the structure of Figure 3 is substituted for that to the left of the line A, A' of Figure 1. In this case in place of the voltage divider VD there is provided a further mutual-inductance-type attenuator similar to that of Figure 1, but continuously adjustable by knob K', operating pinion P cooperating with rack R fixed to bracket B. A reference point RP is provided and scale divisions SD then indicate the deviation from the discrete voltage values in the same way as the scale of meter CFI. If desired meter CFI could be connected to the output line C1', C2' of Figure 3 in addition to or substitution for the position shown in Figure 3.

Figures 4, 4(a) and 4(b) show a further modification in which a different type of mutual-inductance attenuator is utilized. In this case the units L1 and L2 are indicated as being of the so-called "kidney bean" or D-coil type, and are placed in parallel planes as shown in Figure 4(a) with a grounded Faraday screen FN interposed therebetween for preventing capacitive coupling. The screen FN is shown in Figure 4(b) as being comb-shaped to prevent circulating induced currents. Unit L2 is indicated as rotatable by its support from a rotating shaft RS adapted to be rotated by the knob K. Additional inductances L3 and L4 are connected respectively in series with units L1 and L2 and provide a predetermined or predesigned value of minimum coupling between input and output.

Knob K is fixed to a disc member CD which corresponds to the rack R of Figure 1 as a carrier of riders D1, D2 and so forth. These riders are adjustable circumferentially around disc member CD in arcuate fashion in essentially the same manner as the corresponding riders of Figure 1. As indicated, the control disc CD can be brought to and held at rest by any one of the wheels W1, W2, etc. being moved into engagement with the detent member DM in response to actuation of knob K, spring S retaining the disc member CD and hence the unit L2 in fixed position. It is therefore obvious that rotation of knob K will correspondingly vary the voltage produced in the output unit L2 to produce adjustable output voltages across terminals T1 and T2. The riders D1, D2, etc. are then set as before to produce fixed ratios of discrete output voltages across terminals T1, T2. Figure 4 is otherwise the same as Figure 1, and the description of Figure 1 applies thereto.

Figure 5 shows a modification of that portion of Figure 4 to the left of line A, A' by which in place of the voltage divider VD there is utilized an attenuator similar to the main attenuator of Figure 4, having similar D-coil units L1', L2' relatively rotatable by means of knob K' provided with a scale having scale divisions SD cooperating with a reference point marker or index point RP as before. It will be understood that this type of voltage varier can also be utilized in Figure 1 in place of the voltage divider VD thereof.

Figure 6 shows a modification of the portion of Figure 1 or of Figure 4 to the left of line A, A'. In this case, meter CFI is coupled directly across source AC to register the output voltage thereof. Voltage divider VD is here provided with scale divisions SD cooperating with variable contactor VC to indicate the fraction of the input voltage which is supplied to unit L1. Indicator CFI thus indicates the source voltage, and can serve as a monitor for adjusting that voltage to a proper fixed value. Then the scale divisions SD provide a multiplying factor for the discrete decade-stepped output voltages in the same manner as meter CFI in prior figures.

Figure 7 illustrates a modification of Figure 4 in which the voltage divider is placed in the output leads in a fashion similar to Figure 2.

While the invention has been illustrated as applied to mutual-inductance type attenuators, it will be apparent that other forms may be used. In particular, other forms are desirable which include a field-producing member in combination with a field-responsive member, whether the field be magnetic, electrostatic or electromagnetic.

Therefore, the present invention has provided improved apparatus for producing a plurality of discrete output voltages having constant ratio between successive voltage values, in combination with means for varying these output voltages while retaining constant the ratio thereof. Such apparatus has been illustrated as applied to a precise and calibrated signal generator but it will be understood as not necessarily restricted to such use.

It is apparent that many modifications may be made within the spirit of the present invention and it is intended that no limitations on the invention shall be placed other than those imposed by the scope of the appended claims.

What is claimed is:

1. A signal generator comprising a source of alternating voltage, a continuously variable voltage divider coupled to said source and having a pair of output terminals, a first coil coupled to said output terminals, a second coil inductively coupled to said first coil, one of said coils being movable relative to the other, means for moving said one coil, and a plurality of adjustable detent means, each of said detent means determining a position of said movable coil such that the voltages induced in said second coil in response to excitation of said first coil at successive positions of said detent means bear a fixed ratio, whereby a plurality of discrete fixed-ratio output voltages are obtainable from said second coil, each said output voltage being variable by adjustment of said variable voltage divider and over a range covering the voltage outputs at any two adjacent coil positions.

2. A signal generator comprising a source of alternating voltage, a continuously variable voltage adjustor coupled to said source, a mutual inductance attenuator coupled to said voltage adjustor and having a pair of relatively movable inductance units, means for moving one of said units relative to the other, said moving means including mechanical means for determining a plurality of spaced fixed positions of said movable unit for each adjacent pair of which the output voltages from said attenuator bear a fixed ratio, said voltage adjustor having an adjustment range at least equal to said fixed ratio, whereby a plurality of discrete output voltages are selectively obtainable, each variable by adjustment of said voltage adjustor to produce a continuous range of voltage values whose extreme ratio is at least the product of said fixed ratio by the number of said fixed positions.

3. A signal generator as in claim 2 wherein said voltage adjustor comprises a voltage divider.

4. A signal generator as in claim 2 wherein said voltage adjustor comprises a voltage attenuator.

5. A signal generator as in claim 2 wherein said attenuator comprises an enclosed shielding housing formed of a pair of telescoping conductive sections, and an inductance coil fixed to each of said sections, whereby upon relative movement of said sections the separation of said coils is varied to vary the attenuation between the input to one of said coils and the output from the other of said coils.

6. A signal generator as in claim 2 wherein said attenuator comprises a pair of planar D-coils mounted coaxially in parallel planes, one of said coils being relatively rotatable for adjusting the attenuation between the input supplied to one of said coils, and the output derived from the other of said coils.

7. A signal generator as in claim 6 further including a pair of fixed coils inductively inter-coupled with one another and connected respectively in series with each of said D-coils for providing a minimum energy transfer between said input and said output.

8. A decade attenuator for a signal generator or the like comprising an enclosed shielding housing having a pair of relatively movable telescoping sections, first and second intercoupled inductive units each supported within a respective one of said housing sections for joint movement therewith, means for moving said housing sections relative to one another to vary the separation between said units and thereby to vary the attenuation between an input voltage supplied to one of said units and an output voltage derived from the other of said units, and a plurality of adjustable detent means set to define a series of fixed relative positions of said housing sections at adjoining pairs of which said output voltages bear the fixed ratio of 10 to 1 for a given input voltage.

9. An attenuator as in claim 8 wherein each of said inductive units comprises an inductance coil.

10. A decade attenuator for a signal generator or the like comprising first and second inter-coupled field-producing and field-responsive units relatively movable with respect to one another, means for moving one of said units relative to the other to produce variation in the attenuation between an input voltage supplied to one of said units and an output voltage derived from the other of said units, and a plurality of adjustable detent means set to determine a series of fixed relative positions of said units at adjoining pairs of which positions said output voltages bear the fixed ratio of 10 to 1 for a given input voltage.

11. An attenuator as in claim 10 wherein said units comprise a pair of spaced coils mounted for relative translation with respect to one another, and wherein said moving means is adapted to translate one of said coils relative to the other.

12. An attenuator as in claim 10 wherein said units comprise a pair of planar D-coils mounted coaxially with respect to one another for relative rotation, and wherein said moving means comprises means for rotating one of said coils relative to the other.

13. A decade type attenuator for a signal generator or the like comprising first and second inter-coupled field-producing and field-responsive units, one of said units being adapted to produce an output voltage upon excitation of the other of said units, which output voltage is variable in correspondence with change in relative position of said units, means for moving one of said units relative to the other, and a plurality of adjustable detent means set to define a series of fixed relative positions of said units at adjoining pairs of which positions said output voltages bear a fixed ratio for a given input voltage.

References Cited in the file of this patent

UNITED STATES PATENTS

| Number | Name | Date |
|---|---|---|
| 602,709 | Vetter | Apr. 19, 1898 |
| 1,135,040 | Missbach | Apr. 13, 1915 |
| 1,174,726 | Horton | Mar. 7, 1916 |
| 1,528,686 | Neumann | Mar. 3, 1925 |
| 1,582,060 | Lovejoy | Apr. 27, 1926 |
| 1,949,733 | Zidar | Mar. 6, 1934 |
| 2,017,131 | Posthumus | Oct. 15, 1935 |
| 2,037,160 | Ferris | Apr. 14, 1936 |
| 2,062,110 | Swarthwout | Nov. 24, 1936 |
| 2,134,864 | Engel | Nov. 1, 1938 |
| 2,204,179 | George | June 11, 1940 |